United States Patent [19]

Fahey

[11] 3,973,071

[45] Aug. 3, 1976

[54] GLASS FIBER MATERIAL HAVING STRENGTH RETENTION IN A MOIST ENVIRONMENT

[75] Inventor: Dennis M. Fahey, Aspinwall, Pa.

[73] Assignee: PPG Industries, Inc., Pittsburgh, Pa.

[22] Filed: Sept. 22, 1975

[21] Appl. No.: 615,267

Related U.S. Application Data

[63] Continuation-in-part of Ser. No. 461,683, April 17, 1974, abandoned.

[52] U.S. Cl. .............................. 428/292; 106/306; 260/3; 260/37 R; 260/38; 260/42.15; 260/845; 260/846; 427/385; 428/295; 428/378; 428/391; 428/392

[51] Int. Cl.² ................... C04B 31/24; C09C 1/02; C09C 1/28; B32B 17/04

[58] Field of Search ............ 106/306; 260/38, 845, 260/846, 3, 37 R, 42.15; 428/292, 295, 378, 391, 392; 427/385 A

[56] References Cited
UNITED STATES PATENTS

| | | | |
|---|---|---|---|
| 2,287,700 | 6/1942 | Muskat | 106/306 |
| 2,634,250 | 4/1953 | Kiley | 260/845 |
| 2,691,614 | 10/1954 | Wilson | 260/845 |
| 2,888,377 | 5/1959 | Allen | 106/306 |
| 2,979,469 | 4/1961 | Shannon | 260/38 |
| 3,046,152 | 7/1962 | Shivaishi | 106/306 |
| 3,506,476 | 4/1970 | Movzocchi | 260/38 |
| 3,533,830 | 10/1970 | Movzocchi | 260/38 |
| 3,567,671 | 3/1971 | Janetos | 260/846 |
| 3,591,357 | 7/1971 | Janetos | 427/407 |
| 3,718,449 | 2/1973 | Fahey | 428/378 |
| 3,778,406 | 12/1973 | Klotzev | 260/846 |

Primary Examiner—Michael R. Lusignan
Assistant Examiner—William H. Schmidt
Attorney, Agent, or Firm—John E. Curley

[57] ABSTRACT

Glass fiber filament bundles such as cords for rubber reinforcement are impregnated and coated with an elastomer composition such that the coated cord maintains adhesion and tensile strength even in a moist environment due to the inclusion in the coating of a chemically treated diatomaceous earth. These chemically treated diatomaceous earths contain a major portion of an alkali earth metal silicate.

7 Claims, 2 Drawing Figures

GLASS FIBER MATERIAL HAVING STRENGTH RETENTION IN A MOIST ENVIRONMENT

REFERENCE TO CROSS-RELATED APPLICATIONS

This application is a continuation-in-part of application Ser. No. 461,683, filed Apr. 17, 1974, now abandoned.

BACKGROUND OF THE INVENTION

This invention relates to coated glass fiber bundles suitable for rubber reinforcement, and more particularly relates to glass fiber cord having substantially complete individual filament encapsulation with a resorcinol formaldehyde and elastomer coating composition containing a material which retards the degradation of the coated cord during exposure to heat and moisture.

It has long been recognized that glass fiber material makes an ideal reinforcement for rubber products such as automobile tires and the like. In preparing glass fiber material for such applications, the individual glass fibers and groups of glass fibers in the form of strand, rope, cord, roving, fabric and the like are coated with a rubber adhesive to aid in bonding the glass to the elastomeric material to be reinforced. The rubber adhesive generally comprises a resin and an elastomeric material to link between the glass and the main body of material being reinforced. Generally, in the production of fiber glass reinforcing cords or other bundle forms, individual fibers are coated with a sizing and then the fibers are brought together in bundle form. The bundle is then coated by dipping or otherwise contacting it with a coating mixture containing an elastomeric latex and a homogeneous resinous component. Commonly, the sizing contains a coupling agent such as a silane, a lubricant and other ingredients to assist in the handling of the cord during processing.

The term "elastomer", as used herein, is intended to mean and include both synthetic and natural rubber. "Natural rubber", as used herein, is the elastic solid obtained from the sap or latex of the Hevea tree, the major constituent being the homopolymer of 2-methyl-1,3-butadiene (isoprene). "Synthetic rubber", as used herein, is meant to encompass polymers based upon at least 2 percent of a conjugated unsaturated monomer, the conjugation being in the 1 to 3 position in the monomer chain and the final polymer in its uncured state having an extensibility of at least 200 percent and a memory of at least 90 percent when stretched within the extensibility limits and released instantaneously. The conjugated, unsaturated monomers which are used in the preparation of synthetic rubber are, but are not limited to, chloroprene, butadiene, isoprene, cyclopentadiene, dicyclopentadiene and the like. Other olefins capable of free radical, anionic, or cationic interpolymerization into the polymer chain with the conjugated unsaturated monomer are useful in forming synthetic rubbers. These olefins are typically monoethylenically unsaturated monomers. Monoethylenically unsaturated as used herein is characterized by the monomer having one CH=C< group. These monoethylenically unsaturated monomers are, but not limited to, the acrylic monomers such as methacrylic acid, acrylic acid, acrylonitrile, methacrylonitrile, methylacrylate, methylmethacrylate, ethylacrylate, ethylmethylacrylate and the like; monoolefinic hydocarbons such as ethylene, butylene, propylene, styrene, alpha-methylstyrene and the like; and other functional monounsaturated monomers such as vinylpyridine, vinylpyrollidone and the like functional vinylic monomers.

Glass fibers are excellent reinforcing materials and are distinguishable from other fibrous reinforcing materials such as natural and synthetic organic fibers in that glass fibers do not become elongated or deformed under stress to the extent that other fibers do. Unlike other fibers, particular combinations of glass fibers with encapsulating coatings cooperate to yield reinforcing materials that have greater tensile strength than either the glass or coating material alone. While other materials, which are subject to substantial stress elongation, are essentially limited in tensile strength to the basic strength of the bare fibers, even if coated, properly coated glass fibers have greater strength than the glass alone. For example, the low modulus of elasticity of glass may be exploited to provide reinforced tires having superior road performance if an appropriate coating medium is provided to transfer stresses to all fibers in the glass fiber cord so that loading throughout is substantially uniform. This phenomenon is illustrated by the observation that a typical, uncoated glass fiber cord (G-75, 5/0, filament count 2,000 i.g. 2,000 filament strands of G fibers of about $38 \times 10^{-5}$ inch diameter, 7,500 yards per pound) has a tensile strength of about 35 to 40 pounds by ASTM test D578-52, but, when coated with a resorcinol formaldehyde latex coating, such a cord has a tensile strength of about 50 to 70 pounds.

Unfortunately, when exposed to a warm, moist environment, coated glass fiber cords lose strength. After about 1 week of exposure at 120°F. and 95 percent relative humidity, the coated cord described above has a strength of only 35 to 40 pounds. The strength degradation is observed even when the exposure is in a typical warehouse which is dark and not affected by any particular oxidizing atmosphere. The problem is surprising in view of the fact that rubber and elastomer materials themselves are not found to degrade significantly in warm, moist environments absent the influence of ultraviolet light, ozone and higher temperatures. The loss of strength in resorcinol formaldehyde elastomer coated glass fiber cord does not appear to be explained as conventional oxidation for it would be expected that a substantial amount of resorcinol formaldehyde (which has antioxidative characteristics) would protect the elastomer from degradation. It has been found that the addition of typical antioxidants such as phenols, amines and the like do not protect the elastomer adequately from such degradation.

During the course of experimentation, it was found that a material containing 2,6-ditert-butyl-4-phenylphenol absorbed on a diatomaceous earth imparted moisture resistance to the adhesive coated glass fiber bundles in moist environments when used at a 0.4 percent by weight level based on the total elastomer content of the coating composition. This product containing the above phenolic compound and the diatomaceous earth has found much commercial success. Naturally, it was assumed that the phenolic compound was responsible for this improvement in tensile strength after aging due to its known antioxidative and antidegradative properties. However, further investigation surprisingly revealed that the improvement in the aged bundles' tensile strength was due to the treated diatomaceous earth.

It has been necessary in the past to avoid the degradation of elastomer coated glass fiber materials by providing a moisture barrier such as a polyethylene bag about them and providing a desiccant such as a silica gel with the stored materials. Even when this expensive protective storage is employed, it is necessary to expose the coated glass fiber cord during processing such as weaving to moisture laden atmosphere and degradation can then occur. This is an expensive and unsatisfactory solution to the problem. As is described below, a satisfactory solution has been discovered.

SUMMARY OF THE INVENTION

A glass fiber bundle is provided with a coating containing a rubber adhesive comprising a combination of phenolic resin, an elastomer and further containing a treated diatomaceous earth having no 2,6-ditert-butyl-4-phenylphenol therein which enables the cord to retain tensile strength even after prolonged exposure to a moist environment for example, in an environment of 95 percent relative humidity and about 100°F. for a period of at least 8 days. Particular inhibition of moisture induced degradation is observed in partially cured rubber adhesives which retain a capacity for further curing when embedded in an elastomeric material.

Diatomaceous earth is a hydrous opaline form of silica which consists of the skeletons of one celled plants of the class Bacillarieae. These Bacillarieae are enclosed in two overlapping valves of which the cell wall is siliceous in nature thereby constituting the skeleton which is deposited on the floor, below the body of water in which the plants grow, after the organic portion of the plants decay.

These skeletal remains known as diatoms are mined commercially and subsequently used for a plurality of purposes. The diatoms, in some cases, are treated chemically to alter there chemical and physical properties to render them adaptable for particular uses. Among the chemical treatments of diatoms is their hydrothermal reaction with hydrated lime to produce hydrocalcium silicate. Additionally, hydromagnesium silicate is produced by much the same process. Both the hydrocalcium silicate and hydromagnesium silicate are useful in the practice of the instant invention to inhibit moisture induced degradation of the cured rubber adhesive encapsulated glass fibers.

These treated diatomaceous earths are characterized by low bulk densities ranging from 5.5 pounds per cubic foot to 15 pounds per cubic foot and surface areas from 95 square centimeters per gram to 180 square centimeters per gram and are sold by Johns-Mansville Corporation under the names of MICRO-CEL and CELKATE for the hydrocalcium silicates and the hydromagnesium silicates respectively.

Typically, the chemical analysis of the diatomaceous earths useful in the practice of the invention are: for the lime treated diatomaceous earths;

| | |
|---|---|
| $SiO_2$ | 49–67% |
| CaO | 22–28% |
| $Al_2O_3$ | 2.1–3.8% |
| $Fe_2O_3$ | 1.0–1.3% |
| MgO | 0.4–0.6% |
| $Na_2O + K_2O$ | 1.2–1.6% |
| loss on ignition | 14.0–18.5% | and for the magnesium oxide treated diatomaceous earth a typical chemical analysis is as follows:

| | |
|---|---|
| $SiO_2$ | 66% |
| CaO | 1.0% |
| $Al_2O_3$ | 4.3% |
| $Fe_2O_3$ | 1.6% |
| MgO | 16.6% |
| $Na_2O + K_2O$ | 1.0% |
| loss on ignition | 9.1% |

The above are typical chemical analysis and it is understood that other ranges of compositions are within the scope of the invention inasmuch as they are considered by those skilled in the art to be within the compositional ranges of calcium and magnesium treated diatomaceous earths.

Glass fiber bundles in the form of strands, yarns, cords and fabrics, formed from fiber bundles are impregnated with rubber adhesive coatings containing elastomeric latices, both natural and synthetic, such that the fibers are substantially encapsulated with coating and a continuous interconnecting body of coating exists throughout the bundle and about the entire bundle. The coating is provided to interact and adhere to a host material being reinforced, such as rubber. A broad range of elastomeric latices have been used to form the strands, yarns, and cords in glass fiber bundles. Particular elastomeric latices suited for use in this invention include styrene-butadiene-vinylpyridine terpolymers, neoprene, polyisoprene, butyl rubber, butadiene-styrene-copolymers (styrene-butadiene-rubber), acrylonitrile-butadiene-vinylpyridine terpolymers and the like.

Useful resins employed in this invention include resorcinol formaldehyde resins, phenol formaldehyde resins, and the like. Both the resole and novolac type phenolic aldehyde resins have been found to be useful in forming the rubber adhesive coating. The resole resins being characterized by the formation of the resin induced by base catalysis and the novolac resins being characterized by their formation by acid catalysis. Generally, the resole resins are more highly methylolated than the novolacs. The choice between the resole or novolac resin in the rubber adhesive coating composition is contingent on the other materials used in the coating composition itself and the desired properties of the final cord. Rubber adhesive systems which are useful in the practice of the invention include those disclosed in U.S. Pat. Nos. 2,691,614, 2,817,616, and 2,822,311 which are incorporated herein by reference and made a part hereof.

Host material suitable for reinforcement by the coated fiber bundles of this invention and which are resistant to moisture attack include natural rubber and synthetic rubbers as hereinbefore defined and additionally other highly extensible materials such as polyurethane rubber, and like rubbers not based on conjugated unsaturated monomeric materials.

Preferably included on each glass fiber filament is a dual-functional coupling agent such as a silicon containing organic compound or a Werner complex which establishes a bond with the glass through the metal atom and a bond with the rubber adhesive through the organic radicals attached to the metal atom.

Typically useful reactants in the form of silane coupling agents are but not limited to, gamma aminopropyltriethoxy silane, N-bis (beta hydroxyethyl)-gamma-aminopropyltriethoxy silane, N-beta (amino-ethyl gamma-aminopropyltrimethoxy silane, $(CH_3O)_3$ Si $(CH_2)_3$ NH $(CH_2)_2$ NH $(CH_2)_2$ $COOCH_3$, gamma-glycidoxypropyltrimethoxy silane, vinyltriacetoxy silane, gamma-methacryloxypropyltrimethoxy silane, vinyltriethoxy silane, vinyltris (betamethoxyethoxy) silane, beta (3,4-epoxycyclohexyl) ethyltrimethoxy silane and the like. Typical of the sizes which may be applied to the glass fibers of this invention are the sizes disclosed in U.S. Pat. Nos. 3,437,517, and 3,459,585 which are incorporated herein by reference and made a part hereof.

Generally, in the application of the functional components to the bare glass, other components will be present in the sizing and coating mixtures or in the combined sizing and coating mixtures. Residue of materials added to ease processing such as textile lubricants, emulsifiers, wetting agents, catalysts and the like remain in the finished coated glass fiber bundles. A description of the materials added to aid in processing will serve to identify constituents which may be found in the final article and will serve to describe at least some typical methods for producing a coated glass fiber bundle suited for rubber reinforcement and resistance to degradation induced and accelerated by moisture. Typically materials which may be present include the following: vegetable oil, amylose starch, amylopectine starch, fatty acid amides, ammonia soluble carboxyl-containing polymers, such as acrylic interpolymers and carboxylated elastomers, cellosolves, alkali metal salts, oxy-and phenoxypolyalcohols, imidazoline reaction products, ethylene oxide derivatives of sorbitol esters, polyethylene glycol, polyols, such as sorbitol and mannitol, polyethylene, polypropylene and the like.

To the elastomer and resin-containing coating may be added waxes, paraffinic or microcrystalline, to aid in lubrication of the cord during processing and to provide resistance to sun checking, that is, rubber degradation caused by exposure to ultraviolet light. Microcrystalline waxes have found particular utility in the compositions of this invention. It has been observed that during the curing of coatings on glass fiber materials that microcrystalline waxes are substantially retained without any noticeable loss due to smoke evolution as has been observed when paraffin waxes are employed.

Typically, the glass will be coated using aqueous mixtures containing the functional coating materials. The glass may be sized and coated with a single mixture or the glass may be sized by any conventional or known sizing method using commonly known materials and then later coated as a fiber bundle to produce the article herein described. Also, treatment may include heat cleaning or other removal of lubricants, starches, oils and the like after sizing and before coating filament bundles to produce the articles herein disclosed. When sizing and coating from a single mixture, it has been found useful to include an ammonia soluble, carboxyl-containing polymer to stabilize the mixture as described in U.S. Pat. No. 3,853,605, entitled "Coating Composition and Process for Preparing and Applying the Coating Composition to Glass Fibers" by Dennis M. Fahey, assigned to the present assignee and incorporated herein by reference.

It will be understood that organic solvents may be used with or in lieu of water in the aqueous mixtures described above. Although the detailed description provided herein is limited to aqueous systems, it will be appreciated by those skilled in the art that preparation of the articles of this invention using organic solvents is contemplated as well.

A preferred method of producing the coated glass fiber bundles of this invention is to contact a continuous bundle, for example, strand which has previously been sized, with a highly concentrated elastomeric latex and resin-containing aqueous coating bath further containing, as an essential ingredient, a treated diatomaceous earth and having no 2,6-ditert-butyl-4-phenylphenol present as hereinbefore described; and then to dry the coating within and about the bundle and then cure the coating residing within and about the bundle to produce a coated cord suitable for rubber reinforcement. A particularly advantageous method for producing the glass fiber bundles of this invention is based upon the method described in U.S. Pat. No. 3,619,252 entitled "Manufacture of Elastomer Coated Glass Fibers", by Alfred M. Roscher, which is incorporated herein by reference. This invention is particularly applicable to glass fiber filament bundles having complete filament encapsulation and having a relatively high ratio of coating weight to glass weight such as disclosed in application Ser. No. 328,160, now abandoned, filed Jan. 31, 1973, and entitled "Improved Fiber Glass Cord for Reinforcing Rubber and Method for Making Same", by Norman G. Bartrug, assigned to the present assignee and incorporated herein by reference.

A plurality of glass fiber strands each having a slight twist to provide strand integrity, which have previously been sized, are combined in parallel relation and passed through a guide in tangential contact across motor driven rollers. The rollers are partially immersed in an aqueous rubber dip or emulsion, and these rollers pick up this coating material when rotated. The coating, which is picked up, is brought into contact with the glass fiber strands, coating and impregnating the combined bundle of strands. Relaxation of tension in the combined bundle of strands opens the spacing between fibers and between strands enhancing impregnation of the dip or coating into the bundle. The total impregnation is limited by the volume available between the fibers and strands and by the volume of coating solids in the total dip volume which fills the voids in the bundle. High solids concentration in the dip is utilized when it is desired to obtain full impregnation with rubber adhesive and not merely with water. Typically, the resin and elastomeric latex fraction of the aqueous dip will exceed about 28% weight solids and preferably will be between 30% and 40% by weight.

After contacting the fiber glass bundle with the rubber adhesive concentrated dip for sufficient time to fully impregnate the bundle with the water and solids-containing dip, the bundle is passed through a dielectric heater or drying oven. The drying oven is so designed and operated that water is removed rapidly from inside the bundle as well as from the surface of the bundle without substantial migration of the solids from the interior to the surface of the bundle and without excessive blistering.

The dried, glass fiber bundle is then subjected to heat to partially cure the rubber adhesive coating throughout the bundle. It is preferable to partially cure the coating while the coated fiber remains separate and to complete the curing of the coating on the glass fiber bundle when it is embedded in the rubber being reinforced during the curing of the rubber in the final article.

A second method for making the glass fiber bundles of this invention is based upon the method described in U.S. Pat. No. 3,718,448 entitled "Fiber Forming and Coating Process", by Warren W. Drummond and Donald W. Denniston, which is assigned to the present assignee and is incorporated herein by reference and made a part hereof.

Upon forming, individual glass fibers are drawn over a roller coater, such as is described in U.S. Pat. No. 2,873,718. An aqueous rubber adhesive dip having the treated diatomaceous earth included within the coatings of this invention is applied to the fibers passing over the roller.

The coated fibers are brought together into strands and are dried. Drying is accomplished by passing the strands through a dielectric oven, a hot gas or convection oven, or an infrared radiant heating chamber. Strands of glass fibers are brought together into cords or rovings and are further heated to partially cure the resin and latex and bond the strands together into a bundle. Following this, if additional elastomer coating is desired, the composite glass fiber bundle may be further coated or impregnated with additional coating.

BRIEF DESCRIPTION OF THE DRAWINGS

In the accompanying drawing

DESCRIPTION OF PREFERRED EMBODIMENTS

Figure 1:
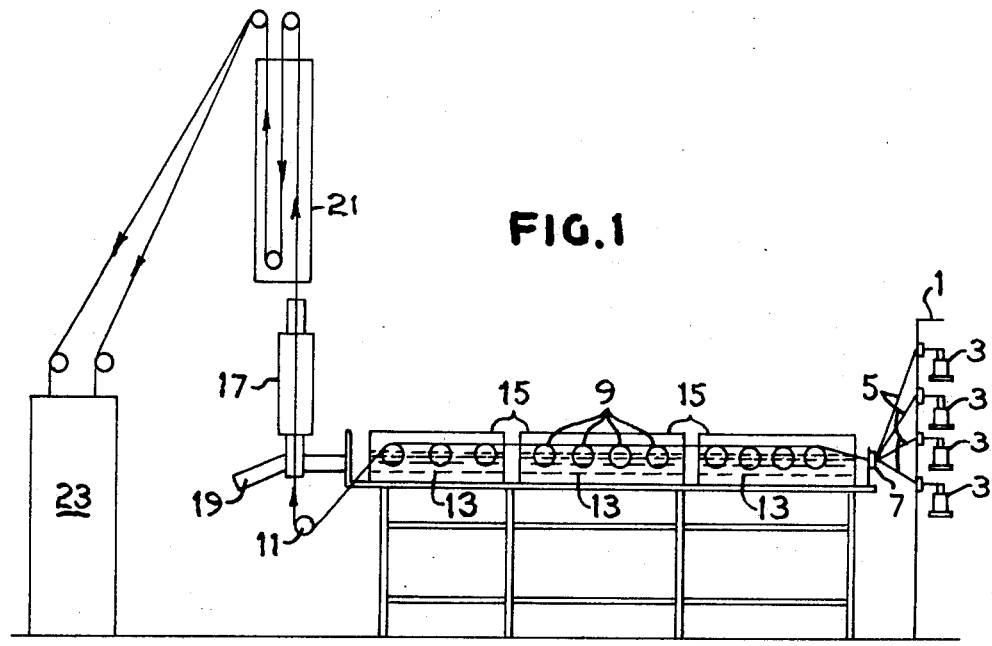
FIG. 1 illustrates a method utilized to prepare elastomer coated glass fiber material of the instant invention.

A coating mixture free of 2,6-ditert-butyl-4-phenylphenol is prepared having the following composition:

Table I

| Ingredients | Range Parts by Weight | Preferred Composition Parts by Weight |
|---|---|---|
| GENTAC Latex (styrene-butadiene vinyl pyridine 15:70:15 41% solids in water) | 1,140–2,100 | 1,400 |
| GENFLO Latex (styrene-butadiene 50:50 41% solids in water) | 0–800 | 467 |
| water | 600–1,000 | 870 |
| NH₄OH 28% | — | 4 |
| PENACOLITE Resin (resorcinol-formaldehyde novolac resin, 0.6 formaldehyde 1 resorcinol, 70% solids in water) | 80–245 | 134 |
| Formalin (37% formaldehyde) | 20–120 | 56 |
| water | 10–70 | 39 |
| MOBILCER Q wax (microcrystalline wax 50% solids in water) | 0–400 | 76.5 |
| treated diatomaceous earth | 0.05–50 | 1.5 |

On a solids basis, the novolac comprises 9 to 12 percent by weight, the formaldehyde 1.4 to 2.5 percent by weight, the combined elastomer 82 to 86 percent by weight, the styrene-butadiene vinyl pyridine being from 61 to 87 percent by weight and the styrene-butadiene ranging from 0 to 25 percent by weight and the treated diatomaceous earth from about 0.02 to about 1 percent by weight. Solids content of the preferred coating dips ranges from about 27 percent to 38 percent by weight of the solution, with the preferred composition having about 32 percent by weight solids.

The mixture is prepared by adding the larger volume of water to a premixed tank followed by the addition of ammonium hydroxide while stirring and then adding the novolac to this mixture while stirring, and continuing stirring until complete dissolution of the resin occurs. The styrene-butadiene vinyl pyridine is added to a batch tank and to it is added the styrene-butadiene rubber, if any, with stirring until complete dissolution occurs followed by continued stirring for about 5 minutes. The premix is then added to the batch tank with stirring which is continued for 5 minutes after addition of the premix. The formaldehyde is then added to the mixture, and the mixture is stirred for 10 minutes. To this is added a solution of the wax with the minor amount of water shown in the above table, and the coating mixture is then allowed to age for at least 2 hours before use.

Glass fiber cord (G-75,5/0, filament count 2,000), which has been sized according to the method for sizing during forming described in U.S. Pat. No. 2,728,972, is coated with the above coating. The sizing present on the glass may be any typical size containing a coupling agent as described above. The preferred size and that used in the examples, unless otherwise indicated is the size described in U.S. Pat. Ser. No. 3,655,353 entitled "Glass Fiber Size", of Charles E. Nalley and Joe B. Lovelace, assigned to the present assignee and here incorporated by reference and made a part hereof.

The resulting coated yarn has an excellent appearance indicating apparent uniform coating distribution throughout. The yarn is freely flexible and when bonded in rubber is found to have excellent adhesion. The rubber coated yarn combination has excellent tensile strength retention and flex resistance.

Preferred embodiments of the resulting coated fiber glass cord have the coating present in an amount of from about 15 to 50 percent by weight and preferably from about 15 to 40 percent by weight of the glass in the cord bundle which may be determined from conventional loss on ignition analysis. Within the dried coating on the cord, the individual constituents comprise on a water-free basis in percents by weight of the coating the following proportions: styrene-butadiene vinyl pyridine terpolymer from about 46 to about 90 percent; novolac resole or phenol-formaldehyde resin from about 10 to about 15 percent; calcium or magnesium silicate in the form of a calcium or magnesium treated diatomaceous earth from about 0.02 to about 5 percent and preferably about 1 percent and microcrystalline wax from about 5 to about 15 percent.

The following examples will further illustrate in detail the nature of this invention.

EXAMPLE I

Several coating dips were prepared having the composition indicated in Table I as the preferred composition. There was no 2,6-ditert-butyl-4-phenylphenol present in these coating dips. The coating composition except for the calcium or magnesium silicate component in the form of treated diatomaceous earth are the same.

In this example, the calcium silicate used is MICRO-CEL E produced by Johns-Manville the analysis of which is as follows:

| Component | Percentage |
|---|---|
| $SiO_2$ | 54.3 |
| $CaO$ | 25.1 |
| $Al_2O_3$ | 3.6 |
| $Fe_2O_3$ | 1.2 |
| $MgO$ | 6.5 |
| $Na_2O + K_2O$ | 1.3 |

| Component | Percentage |
|---|---|
| *-continued* | |
| loss on ignition | 14 |

Samples of glass fiber cord, G-75, 5/0 which has been sized in accordance with a size having the following composition:

| Ingredients | Parts by Weight grams |
|---|---|
| Polypropylene emulsion containing 25% by weight of polypropylene (molecular weight 6,300) and 6% by weight of emulsifying agents | 5,000 |
| polyvinyl alcohol (Evanol 52-22 sold by DuPont) | 500 |
| imidazolamine (Emery Industries 1,200-136) | 200 |
| Methyacryloxypropyltrimethoxy silane | 250 |
| acetic acid | 8 |
| silicone defoamer (SAG 470) | 3.8 |
| water | sufficient to make 10 gallons |

The above sizing composition was applied to the fibers during formation in accordance with the method described in U.S. Pat. No. 3,655,353.

Referring to the drawings in detail, FIG. 1 shows a creel 1 having mounted thereon a plurality of bobbins 3 containing glass fiber strands 5. Each of the glass fiber strands 5 is coated with a sizing material comprising a lubricant, binder and coupling agent. Furthermore, as is conventional, each of the glass fiber strands 5 has imparted therein a 0.5 turn per inch twist to provide strand integrity and resistance to fuzzing during initial handling or processing prior to being coated and impregnating with elastomeric material.

The strands 5 are combined in parallel relation and passed through a ceramic guide 7, in tangential contact across motor driven rotating rollers or dip applicators 9, to a motor driven rotating wiper roller or pulley 11. The rollers or dip applicators 9 are partially suspended in an aqueous rubber dip or emulsion 13 contained within vessels or tanks 15. The dip applicators 9 are driven counter to the direction of travel of the strands 5 to improve the coating and impregnation thereof. The pickup of rubber dip 13 by the applicators 9 and strands 5 is more than sufficient to coat and impregnate the strands with the desired final amount of rubber dip or adhesive material 13. The wiper roller or pulley 11 is driven with the direction of travel of the strands 5 and serves to change the direction of the strands with care to avoid removing rubber dip or adhesive material 13, except in excess of that required to obtain the beneficial effects of coating.

From the wiper roller or pulley, the coated, impregnated strands are passed vertically through a dielectric heater or drying oven 17, wherein water and other volatile constituents of the rubber dip 13 are driven off, and removed from the dielectric oven 17 by means of a blower 19. A suction device (not shown) could be used in lieu of or in addition to the blower 19 and would preferably be located adjacent the upper or exit end of vertically arranged dielectric oven 17. The construction of a typical dielectric heating or drying oven, suitable for use with the present invention, is shown more fully in FIG. 2.

Figure 2:
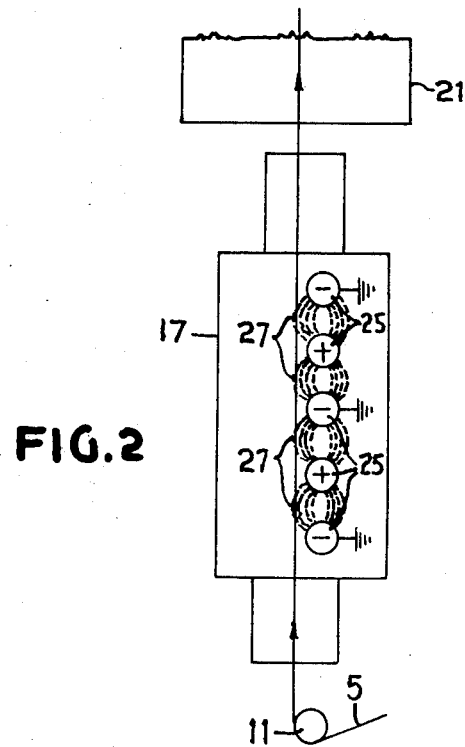
FIG. 2 is a diagrammatic illustration of the interior of the dielectric oven utilized to dry the impregnated cords.

Referring to FIG. 2, there is shown a diagrammatic representation of dielectric heater 17 comprising a vertically arranged series of spaced electrodes 25 electrically connected to a suitable power source (not shown) to produce an alternating, high frequency electrical field 27 between successive oppositely charged electrodes. As the strands 5, coated and impregnated with aqueous rubber dip 13, traverse across but not contacting the electrodes 25 and through fields 27, the liquid component of the dip, water, which has a higher dielectric constant than the solid component, is electrically activated to produce a uniform heating action throughout dip material 13. The rate and amount of electrical activation or dielectric heating is controlled to the extend of removing or volatilizing substantially all of the liquid component of the aqueous dip material while leaving the solid component substantially unaffected. The coated and impregnated strands 5, as they leave dielectric heater 17, are free of bubbles and sufficiently dry and free of tack for the purpose of further processing the strands over rolls, pulleys or the like without fear of stripping off coating material and/or depositing coating material on supporting and conveying elements or the like.

Thereafter, the coated strands pass upwardly and then traverse through a hot gas oven 21 or other suitable heating device to partially cure or react the solid component of the adhesive 13. Following attainment of the desired degree of cure, the adhesive coated fiber glass strands are removed from the oven 21 and collected on a suitable take-up device 23.

Samples of fiber glass cord prepared according to the description above were evaluated to determine cord strength according to ASTM procedure D578-52 modified by replacement of Scott Spino clamps C33975 with G61-4D-0 clamps covered on cord contact surfaces with electrical tape. Following the initial testing of the samples of cord the samples were aged for varying times and after aging, the samples were tested according to this modified ASTM test for strength. Test results and aging periods are summarized in Table II.

Moisture aging is accomplished by placing coated cord samples on a tray in a sealed box about 2 feet × 3 feet × 4 feet with the tray about one inch from the floor of the box, maintaining liquid water on the floor of the box, and holding the box in a thermostatically controlled heating room maintained at 120°F. Periodic checks of relative humidity in the box indicate a relative humidity of 90–95 percent. The interior of the box is dark. Samples are held in such a box for various periods then are removed and tested for strength.

EXAMPLE II

Example I was repeated except that the MICRO-CEL E was substituted with MICRO-CEL B diatomaceous earth having the following analysis:

| Component | Percentage |
|---|---|
| $SiO_2$ | 52.9 |
| $CaO$ | 22.6 |
| $Al_2O_3$ | 3.6 |
| $Fe_2O_3$ | 1.2 |
| $MgO$ | 0.4 |
| $Na_2O + K_2O$ | 1.3 |
| ignition loss | 18.0 |

Tensile aging results are reported in Table II following.

EXAMPLE III

Example I was repeated except that MICRO-CEL E was substituted with MICRO-CEL T-26 having the following analysis:

| Component | Percentage |
|---|---|
| $SiO_2$ | 54.3 |
| $CaO$ | 25.1 |
| $Al_2O_3$ | 3.6 |
| $Fe_2O_3$ | 1.2 |
| $NgO$ | 0.5 |
| $Na_2O + K_2O$ | 1.3 |
| ignition loss | 14.0 |

The results of the tensile aging test is reported in Table II following.

EXAMPLE IV

Example I is repeated except that MICRO-CEL E diatomaceous earth is substituted with CELKATE T-21 having the following chemical analysis:

| Component | Percentage |
|---|---|
| $SiO_2$ | 66.4 |
| $CaO$ | 1.0 |
| $Al_2O_3$ | 4.3 |
| $Fe_2O_3$ | 1.6 |
| $NgO$ | 16.6 |
| $Na_2O + K_2O$ | 1.0 |
| ignition loss | 9.1 |

The results of the tensile aging test are reported in Table II following.

EXAMPLE V: CONTROL

Example I was repeated except that no diatomaceous earth was added to the coating mixture. Table II summarizes the results of the testing of Examples I through V.

TABLE II

| | TENSILE STRENGTH IN POUNDS AGED AT LEAST | | | | |
|---|---|---|---|---|---|
| Example No. | Initial | 16 days | 24 days | 32 days | 48 days |
| I | 60 | 54 | 54 | 53 | 55 |
| II | 63 | 54 | 57 | 53 | 55 |
| III | 62 | — | 56 | 55 | 54 |
| IV | 61 | 58 | 58 | 56 | 48 |
| V | 66 | 37 | — | — | — |

It is evident from Table II that cords prepared according to this invention substantially retain their strength after exposure to a moist environment compared with cords which do not contain calcium silicate or magnesium silicate in the form of treated diatomaceous earths.

Considering the severity of the aging conditions employed, cords are considered to have substantially retained their initial strength if after 16 days of exposure as described above the cords retain at least 70 and preferably 75 percent of their strength. It will be noted from Table II that only those samples prepared according to this invention substantially retain their strength. Samples prepared without the addition of the diatomaceous earths have not been found to exhibit the strength retention found for the coated cords of this invention.

While the above examples have been conducted using a specific coating composition, it is to be understood that other coating compositions may be used which are known to those skilled in the art and additionally the treated diatomaceous earths can be incorporated into a combined sizing and coating composition to form an improved glass fiber bundle having increased tensile strength retention.

While the present invention has been described with reference to particular preferred embodiments, it will be appreciated by those skilled in the art that variations may be employed without departing from the spirit of the invention and the invention is only to be limited insofar as is set forth in the accompanying claims.

I claim:

1. In a glass fiber bundle suitable for reinforcing a host elastomeric material comprising: a bundle of sized glass fibers having disposed about and throughout the bundle a coating composition containing a phenolic resin and an elastomer selected from the group consisting of styrene-butadiene-vinylpyridine terpolymers and styrene butadiene copolymers as essential ingredients, the improvement comprising: said coating composition having therein a treated diatomaceous earth selected from the group consisting of magnesium silicate and calcium silicate diatomaceous earths in an amount effective to provide for substantially retained tensile strength of the glass fiber bundle after exposure to a moist environment of 95 percent relative humidity and about 100% F. for a period of at least 8 days, and wherein said coated glass fiber bundle contains no 2,6-ditert-butyl-4-phenylphenol therein.

2. The glass fiber bundle of claim 1 wherein the phenolic resin of said coating composition is selected from the group consisting of resorcinol-formaldehyde resin, phenol-formaldehyde resin and mixtures thereof.

3. The glass fiber bundle of claim 1 wherein the diatomaceous earth is present from about 0.02 to about 2.0 percent by weight of the phenolic resin and elastomer containing coating composition.

4. The glass fiber bundle of claim 1 wherein the coating composition is present from about 15 to about 40 percent by weight of the glass in the bundle.

5. The glass fiber bundle of claim 1 wherein the coating composition further comprises a microcrystalline wax.

6. An elastomeric material reinforced with the glass fiber bundle of claim 1.

7. In the preparation of phenolic resin and elastomer coated glass fiber materials for rubber reinforecement, wherein said elastomer is selected from the group consisting of styrene-butadiene-vinyl pyridine terpolymers and styrene-butadiene copolymers, wherein said coated glass fiber material contains no 2,6-ditert-butyl-4-phenyl-phenol therein and further, wherein the coated materials are subject to degradation under conditions of high humidity and high ambient temperature the improvement whereby the degradation is retarded comprising coating the glass fiber material with a phenolic resin and elastomer containing coating composition having therein as an essential ingredient, a treated diatomaceous earth selected from the group consisting of magnesium silicate and calcium silicate diatomaceous earths in an efective amount to retard the degradation of said glass fiber coated material after said material is exposed to a moist environment of 95 percent relative humidity at about 100°F. for a period of at least 8 days.

* * * * *

UNITED STATES PATENT AND TRADEMARK OFFICE
CERTIFICATE OF CORRECTION

PATENT NO. : 3,973,071
DATED : August 3, 1976
INVENTOR(S) : Dennis M. Fahey

It is certified that error appears in the above-identified patent and that said Letters Patent are hereby corrected as shown below:

Column 12, Claim 1, line 30, "%" should be --°--.

Column 12, Claim 7, line 49, "reinforecement" should be --reinforcement--.

Column 12, Claim 7, line 63, "efective" should be --effective--.

Signed and Sealed this

Twenty-sixth Day of October 1976

[SEAL]

Attest:

RUTH C. MASON
*Attesting Officer*

C. MARSHALL DANN
*Commissioner of Patents and Trademarks*